United States Patent
Obrecht et al.

(10) Patent No.: US 7,748,039 B2
(45) Date of Patent: Jun. 29, 2010

(54) METHOD AND APPARATUS FOR DETECTING MALICIOUS CODE IN AN INFORMATION HANDLING SYSTEM

(75) Inventors: Mark Obrecht, Austin, TX (US);
Michael Tony Alagna, Austin, TX (US);
Andy Payne, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 1095 days.

(21) Appl. No.: 10/231,557

(22) Filed: Aug. 30, 2002

(65) Prior Publication Data

US 2004/0054917 A1    Mar. 18, 2004

(51) Int. Cl.
  G06F 12/14    (2006.01)
  G06F 12/16    (2006.01)
  G08B 23/00    (2006.01)
(52) U.S. Cl. ......................................................... 726/25
(58) Field of Classification Search ................... 726/22, 726/24, 25; 713/188, 187, 164; 705/51, 705/52
See application file for complete search history.

(56) References Cited

U.S. PATENT DOCUMENTS

| | | | |
|---|---|---|---|
| 5,121,345 A | | 6/1992 | Lentz |
| 5,398,196 A * | | 3/1995 | Chambers ..................... 714/28 |
| 5,440,723 A | | 8/1995 | Arnold et al. |
| 5,537,540 A | | 7/1996 | Miller et al. |
| 5,802,277 A | | 9/1998 | Cowlard |
| 5,919,257 A * | | 7/1999 | Trostle ......................... 726/22 |
| 5,956,481 A | | 9/1999 | Walsh et al. |
| 5,974,549 A * | | 10/1999 | Golan ........................... 726/23 |
| 6,088,804 A | | 7/2000 | Hill et al. |
| 6,182,227 B1 | | 1/2001 | Blair et al. |
| 6,266,774 B1 | | 7/2001 | Sampath et al. |
| 6,272,641 B1 * | | 8/2001 | Ji ............................... 726/24 |
| 6,330,588 B1 | | 12/2001 | Freeman |
| 6,357,008 B1 * | | 3/2002 | Nachenberg ................. 726/24 |

(Continued)

FOREIGN PATENT DOCUMENTS

WO    02/03178    1/2002

(Continued)

OTHER PUBLICATIONS

Shieh, et al, "A Pattern-Oriented Intrusion-Detection Model and its Applications," IEEE, 1991, pp. 327-342.

(Continued)

*Primary Examiner*—Benjamin E Lanier
(74) *Attorney, Agent, or Firm*—Meyertons, Hood, Kivlin, Kowert & Goetzel, P.C.

(57) ABSTRACT

A method for detecting malicious code on an information handling system includes executing malicious code detection code (MCDC) on the information handling system. The malicious code detection code includes detection routines. The detection routines are applied to executable code under investigation running on the information handling system during the execution of the MCDC. The detection routines associate weights to respective executable code under investigation in response to detections of a valid program or malicious code as a function of respective detection routines. Lastly, executable code under investigation is determined a valid program or malicious code as a function of the weights associated by the detection routines. Computer-readable media and an information handling system are also disclosed.

54 Claims, 2 Drawing Sheets

U.S. PATENT DOCUMENTS

| | | | |
|---|---|---|---|
| 6,393,568 | B1 | 5/2002 | Ranger et al. |
| 6,523,120 | B1 | 2/2003 | Strasnick |
| 6,671,812 | B1 | 12/2003 | Balasubramaniam et al. |
| 6,772,346 | B1 * | 8/2004 | Chess et al. .................. 716/13 |
| 6,775,780 | B1 * | 8/2004 | Muttik ......................... 726/24 |
| 6,802,028 | B1 * | 10/2004 | Ruff et al. .................... 714/38 |
| 6,944,772 | B2 * | 9/2005 | Dozortsev .................. 713/180 |
| 6,973,577 | B1 | 12/2005 | Kouznetsov |
| 2002/0066024 | A1 | 5/2002 | Schmall et al. |
| 2002/0116635 | A1 | 8/2002 | Sheymov |
| 2002/0150243 | A1 | 10/2002 | Craft et al. |
| 2002/0174137 | A1 | 11/2002 | Wolff et al. |
| 2003/0033536 | A1 | 2/2003 | Pak et al. |
| 2003/0079145 | A1 * | 4/2003 | Kouznetsov et al. ........ 713/200 |
| 2003/0159070 | A1 | 8/2003 | Mayer et al. |
| 2003/0174137 | A1 | 9/2003 | Leung et al. |
| 2004/0064736 | A1 | 4/2004 | Obrecht et al. |
| 2004/0098607 | A1 | 5/2004 | Alagna et al. |
| 2004/0123157 | A1 | 6/2004 | Alagna et al. |
| 2004/0187023 | A1 | 9/2004 | Alagna et al. |
| 2005/0137980 | A1 | 6/2005 | Bullock et al. |

FOREIGN PATENT DOCUMENTS

| | | |
|---|---|---|
| WO | WO 02/03178 | 1/2002 |
| WO | 02/095553 | 11/2002 |
| WO | WO 02/103533 | 12/2002 |
| WO | WO 2004/021197 | 3/2004 |
| WO | WO 2004/055632 | 7/2004 |
| WO | WO 2004/072777 | 8/2004 |

OTHER PUBLICATIONS

Office Action Mailed Mar. 23, 2006, 13 pages.

Veldman, "Combating Viruses Heuristically", Virus Bulletin Conference, Virus Bulletin Ltd., Abington, GB, Sep. 1993.

International search report application No. 04707408.3 mailed Mar. 2, 2007.

Veldman, Frans, "Combating Viruses Heuristically," Virus Bulletin Conference, Virus Bulletin Ltd., Abington, GB, Sep. 1993, pp. 67-75, XP000828110.

Nachenberg, Carey, "Behavior Blocking: The Next Step in Anti-Virus Protection," http://www.securityfocus.com/ infocus/1557, retrieved Jul. 25, 2007, pp. 1-5, XP002444153.

"Automated Program Analysis for Computer Virus Detection," IBM Technical Disclosure Bulletin, IBM Corp., New York, US, vol. 34, No. 2, Jul. 1, 1991, pp. 415-416, XP000211158, ISSN: 0018-8689.

Supplemental European Search Report mailed Aug. 6, 2007, cited in European Application No. 03791906.5.

Office Action cited in U.S. Appl. No. 10/647,644, dated Aug. 10, 2007.

Office Action of Dec. 12, 2007, in U.S. Appl. No. 10/647,644, 16 pages.

Office Action of Mar. 7, 2008, in U.S. Appl. No. 10/231,557, 13 pages.

Amendment; Response to Office Action of Mar. 7, 2008, in U.S. Appl. No. 10/231,557, pp. 1-24.

Office Action of Nov. 13, 2009, in U.S. Appl. No. 10/647,644, 11 pages.

* cited by examiner

METHOD AND APPARATUS FOR DETECTING MALICIOUS CODE IN AN INFORMATION HANDLING SYSTEM

BACKGROUND

The present disclosure relates generally to information handling systems, and more particularly to a method and apparatus for detection of malicious computer code in the form of a Trojan horse in an information handling system.

Trojan Horses ("Trojans") are a particular type of malicious code. Malicious code is code that executes on an information handling system, typically a computer, but it can also be a Personal Digital Assistant or other information handling device, and is intended to damage the computer, alter the computer without the permission of the computer's user, or use the computer against the wishes of the computer's user. The Trojan horse is executable code that can exist in one of many forms. For example, some but not all of the forms that Trojans can be instantiated in executable code are as one or more programs, threads inside other programs, plugins or shared modules loaded by other programs, or modules loaded into operating system kernel memory in the manner of a device driver or loadable kernel module. A Trojan is a form of malicious code that enables a person to remotely control someone else's computer. The person who remotely controls the computer is known as the "Evil Hacker" while the person whose computer is being remotely controlled is known as the "Innocent Victim". BackOrifice2000, SubSeven, NetBus and OptixPro are all examples of Trojans. Trojans are sometimes referred to as "back-doors" or "hacker back-doors."

Most Trojans have two components, the client program (Trojan Client) that is run on the Evil Hacker's computer and the server program (Trojan Server) that is run on the Innocent Victim's computer. Some Trojans have only a Trojan Server that can be remotely controlled through manually entered commands rather than through the programmatic interface of a Trojan Client.

Trojans can be used by Evil Hackers to disrupt the normal operation of the Innocent Victim's computer, to spy on the Innocent Victim, to steal money from the Innocent Victim, or to steal intellectual property from the Innocent Victim. The Evil Hacker often uses the Innocent Victim's computer to perform these malicious activities in order to harm the organization to which the Innocent Victim belongs. Trojans can thus harm computer systems, whether or not the particular computer systems belong to an individual, a company, organization, or government.

There are many ways to infect a computer with a Trojan including sending the Innocent Victim the Trojan Server disguised as a valid program, copying the Trojan Server onto the Innocent Victim's computer, or exploiting a vulnerability in the Innocent Victim's computer to place the Trojan Server on the computer.

Several techniques exist that are effective for detecting some forms of malicious code. For example, some types of malicious code can be detected by examining the binary code image of the running program or the binary image of the program when it is stored on a storage device. Many malicious code programs can be identified by a unique bit or byte pattern. The unique bit or byte pattern can comprise the entire image of the program while it is in memory or while it is stored on disk. The signature can also be a bit or byte pattern that is a portion of the program in memory or on disk. Once the unique sequence has been identified, a signature can be developed to identify the sequence. The signature is often the bit or byte pattern itself or it is in the form of a checksum. A detection program can then search for a malicious code program using the signature to identify the unique bit or byte sequence. Trojans, however, can be configured so that they have no easily identifiable signature. Trojans have configuration parameters that change the bit or byte sequences in the program and make it difficult or impossible to provide a unique signature. There are many tools available that can be used to reconfigure a Trojan so that it will not have a known signature.

Another technique used to identify malicious code examines the behavior of a Trojan Server while the Trojan Server is loaded and installed on a computer. With such a technique, a loaded and installed program is first placed into a Sandbox. The Sandbox comprises a restricted area on the computer where the program (e.g., Trojan Server) can be examined safely. While such an approach may be effective for preventing some Trojan infection, the approach does not however detect Trojan Servers once they are already installed on a computer. Such an approach does not detect many Trojan Servers because Trojans do not exhibit their most characteristic behaviors while they are being loaded or installed, but rather they come alive and exhibit their malicious behavior after they have been loaded and installed.

Accordingly, it would be desirable to provide an improved method for detecting Trojans in a computer system and overcoming problems in the art discussed above.

SUMMARY

A method for detecting malicious code on an information handling system includes executing malicious code detection code on the information handling system. The malicious code detection code includes detection routines. The detection routines are applied to executable code under investigation running on the information handling system during the execution of the malicious code detection code. The detection routines assign weights to respective executable code under investigation in response to detections of a valid program or malicious code as a function of respective detection routines. Lastly, executable code under investigation is determined a valid program or malicious code based on scores that are determined as a function of the weights assigned by the detection routines. Computer-readable media and an information handling system are also disclosed.

DETAILED DESCRIPTION

Figure 1:
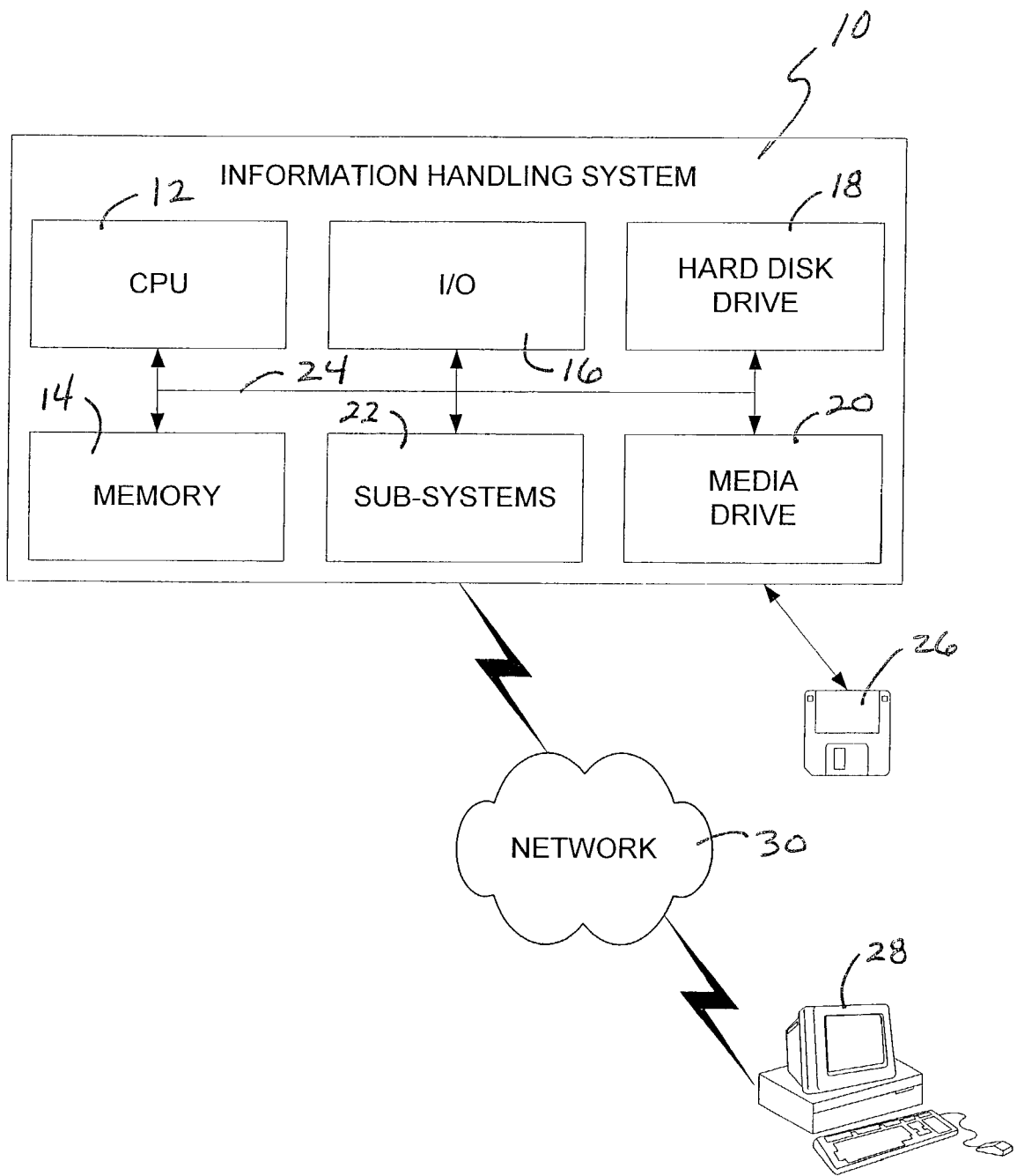
FIG. 1 is a system block diagram of an information handling system for implementation of the method of detecting a Trojan according to one embodiment of the present disclosure.

In FIG. 1, a system block diagram of an information handling system 10 for implementing the method of detecting a Trojan according to one embodiment of the present disclosure is shown. Information handling system 10 including one or more of: a central processing unit (CPU) 12, memory 14, input/output (I/O) devices, such as a display, a keyboard, a mouse, and associated controllers, collectively designated by a reference numeral 16, a hard disk drive 18, or other storage devices or media drives, such as may include a floppy disk drive, a CD-ROM drive, a DVD drive, and the like, collectively designated by a reference numeral 20, or various other subsystems, such as a network interface card, wireless communication link, etc, collectively designated by a reference numeral 22, all interconnected, for example, via one or more buses, shown collectively as a bus 24. Examples of information handling system may include a computer system, a personal digital assistant, a thin client device, a thick client device, or similar information handling device.

In one embodiment, information handling system (IHS) 10 is configured with a suitable operating system to install and run executable code, programs, etc., from one or more computer readable media 26, such as a floppy disk, CD-ROM, DVD, or the like. Information handling system 10 may further be configured for communicating with another information handling system 28, for example, through a network 30 via a suitable communication link or links. The operating system of IHS 10 may also be configured to install and run programs, download data, etc., via network 30. The illustrative embodiments of the present disclosure may be practiced over an Intranet, the Internet, virtual private network, or other suitable communication network.

According to one embodiment, the method of Trojan detection is implemented in the form of computer software, the computer software comprising instructions executable by the CPU of a computer system, for example, an Innocent Victim's computer system. The instructions include suitable program code processable by the computer system for performing the various functions as described herein. The various functions as discussed herein can be programmed using programming techniques well known in the art.

A novel method for detecting Trojans includes a method for detecting a server portion of a Trojan residing on a target computer system, for example, an innocent victim computer system. Furthermore, the method identifies the server portion of the Trojan when the server portion is executing on the target computer. As briefly discussed above, most Trojans have two components, a client program (Trojan Client) that is run on an Evil Hacker's computer and the server program (Trojan Server) that is run on the Innocent Victim's computer.

Accordingly, the method of detecting a Trojan includes a procedure for detecting a Trojan Server, i.e. the portion of a Trojan that resides on the Innocent Victim's computer system. The procedure can be embodied in a computer program, for example, a Trojan detection program. The Trojan detection program detects the presence of a Trojan while it is executing on a computer.

Figure 2:
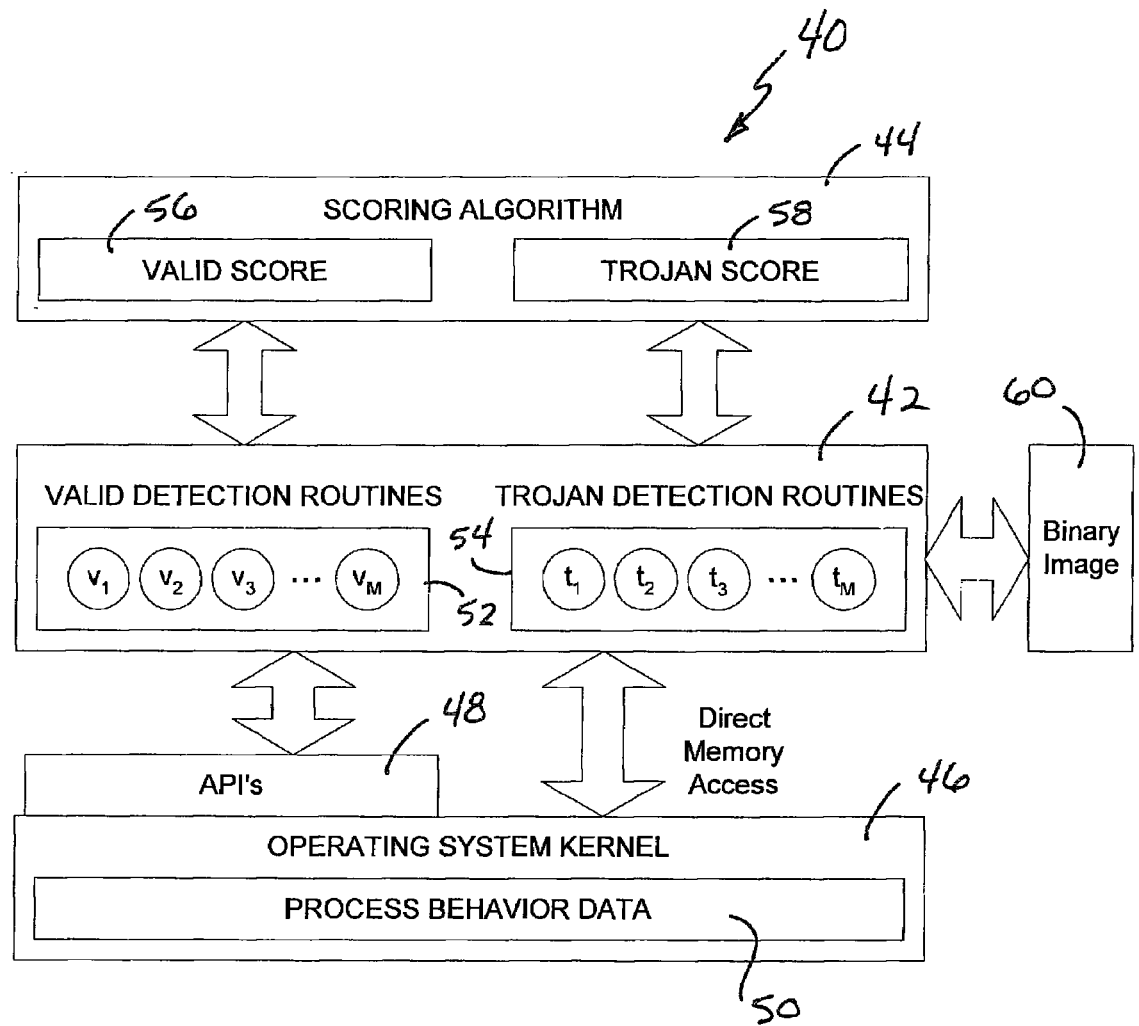
FIG. 2 illustrates a detection architecture of a Trojan detection program according to one embodiment of the present disclosure.

FIG. 2 illustrates an architecture of a Trojan detection program 40 according to an embodiment of the present disclosure. The Trojan detection program 40 includes detection routines 42 and a scoring algorithm 44. The detection routines 42 operatively couple to the operating system kernel 46 of the computer system under investigation via application programming interfaces (APIs) 48. The detection routines also access process behavior data 50 and binary image data 60, according to the particular requirements of a corresponding detection routine, further as discussed below.

In one embodiment, the Trojan detection program operates as follows. The Trojan detection program executes at any time, on an as-needed basis, a periodic basis, a random basis, another scheduled basis, or on an event driven basis in response to a particular event according to the particular requirements of a given situation. When the Trojan detection program executes, it examines the characteristics and behaviors of all computer programs that are executing at the current time on the subject computer system. The Trojan detection program evaluates each computer program that is running on the computer system under investigation, to determine whether the running computer program is a valid program or a Trojan.

The Trojan detection program 40 contains detection routines 42, including valid program detection routines 52 and Trojan detection routines 54. The valid program detection routines 52 include one or more routines identified by $v_1, v_2, v_3, \ldots, v_M$ in FIG. 2. The valid program detection routines 52 are configured to determine whether the program under investigation has characteristics and behaviors usually associated with a valid program. The Trojan detection routines 54 include one or more routines identified by $t_1, t_2, t_3, \ldots, t_N$ in FIG. 2. The Trojan detection routines 54 are configured to determine whether the program under investigation has characteristics and behaviors usually associated with a Trojan.

In one embodiment, the valid program detection routines 52 and the Trojan detection routines 54 are configured to gather information about each program under investigation by examining the program itself and by looking for information about the program in the operating system 46. The detection routines 42 access information from the operating system 46 using application programming interfaces (APIs) 48 to the operating system. The API's 48 can include documented API's, undocumented API's, direct access to resources of the computer or information handling system such as memory or network connections, or kernel or device driver interfacing. The detection routines 42 gather information from the program itself by examining one or more of a binary image of the program that is stored in memory, a binary image of the program that is stored on disk or other media, the characteristics and behavior of the program, and any other related programs (such as libraries used by the program under investigation), represented by reference numerals 50 and 60 in FIG. 2.

For example, a detection routine 42 can be configured to take into account the following. Many Trojans log keystrokes on the Innocent Victim's computer and transmit the keystroke data from the Innocent Victim's computer to the Evil Hacker's computer. In one embodiment, a Trojan detection routine 54 determines whether or not the program being examined is logging keystrokes. Since there are many different ways for a program to log keystrokes, one or more of the Trojan detection routines 54 can be configured to examine the program under investigation to determine whether the program is using any of a number of different mechanisms for logging keystrokes.

The Trojan detection program 40 further includes a scoring algorithm 44. The scoring algorithm calculates two scores—a valid program score 56 and a Trojan score 58. If the result of a valid program detection routine 52 indicates that the characteristic or behavior of the program being examined was that of a valid program, then a weight, $W_i$, is associated with the routine and that weight contributes positively to the valid program score 56. A weight, $W_i$, is assigned to each valid program detection routine, for i=1 to M, where M is the number of the valid program detection routine.

If the result of a Trojan detection routine 54 indicates that the characteristic or behavior of the program being examined was that of a Trojan, then a weight, $W_j$, is associated with the routine and that weight contributes positively to the Trojan score 58. A weight, $W_j$, is assigned each Trojan detection routine, for j=1 to N, where N is the number of the Trojan detection routine.

According to one embodiment, the scoring algorithm 44 comprises an algorithm that includes an algebraic formula for determining the two scores 56 and 58. The scoring algorithm is dependent on the valid program detection routines 52 and the weights, $W_i$, associated with each valid program detection routine, in addition to, the Trojan detection routines 54 and the weights $W_j$, associated with each Trojan detection routine. The algebraic formula or equation can also be made arbitrarily complex, for example, to include associating weights to one or more to combinations of detection routines 42.

In one embodiment, the scoring algorithm 44 includes an algebraic equation defined as a sum of weighted values. For example, the algebraic equation for the valid program detection routines can include an equation as given by:

$$VALIDSCORE = \sum_{i=1}^{M} W_i,$$

where $W_i$=weight of a valid detection routine $v_i$ for i=1 to M.

Similarly, the algebraic equation for the Trojan detection routines can include an equation as given by:

$$TROJANSCORE = \sum_{j=1}^{N} W_j,$$

where $W_j$=weight of a Trojan detection routine $t_j$ for j=1 to N.

In another embodiment, more complex forms of the scoring algorithm 44 can be implemented in the form of more sophisticated algebraic formulae.

If a program under investigation exceeds a valid program score threshold, $V_{thres}$, then it is determined that the program is a valid program. If that program exceeds a Trojan score threshold, $T_{thres}$, then it is determined that the program is a Trojan program. If a program is deemed to be valid using the valid algorithm, then it is sometimes removed from consideration from additional Trojan score routines.

Executable code and/or programs under investigation may also have some of the characteristics and behaviors of valid programs and some of the characteristics and behaviors of Trojans. If a program does not exceed either threshold or if a program does not have a significant difference between the valid program score 56 and the Trojan score 58, then according to another embodiment of the present disclosure, the method identifies the program in another category of Suspicious Programs or Anomalous Programs.

In one embodiment, the method for detecting malicious code on a computer system includes executing a malicious code detection program on the computer system. The malicious code detection program includes detection routines. The malicious code detection program applies the detection routines to programs running on the computer system during the execution of the malicious code detection program. The detection routines are assigned weights that are factored by a scoring algorithm to determine a composite score based on the results of the detection routines and their associated weights. For example, a malicious code detection routine has a weight associated with it, such that if the malicious code detection routine determines that a given code under investigation is a Trojan, then the weight is applied positively towards the malicious code score for the code under investigation. Lastly, the malicious code detection program determines whether one or more programs of all programs running on the computer system during operation of the malicious code detection program is a valid program or malicious code as a function of the weights assigned to the detection routines.

In another embodiment, the method is configured to detect malicious code in the form of a Trojan horse on a computer having an operating system. The method includes executing a malicious code detection program on the computer. Detection routines of the malicious code detection program are configured to gather information about programs running on the computer during execution of the malicious code detection program. The detection routines include at least one selected from the group consisting of a) examining each executable code or program itself and b) searching for information about each executable code or program in the operating system. For example, examining code or a program can include examining a binary image of the same, wherever the binary image may reside, within the IHS or in computer readable media accessible to the IHS. In addition, the detection routines further consist of valid program detection routines and malicious code detection routines.

The malicious code detection program applies the detection routines to the programs running on the computer. In response to a detection of a valid program or malicious code, the detection routines assigns weights to respective programs under test as a function of a respective detection routine. Lastly, the malicious code detection program determines whether a program is a valid program or malicious code as a function of the weights assigned by the detection routines. Determining whether the program is a valid program or malicious code involves the scoring of an execution of each detection routine as a function of a respective weight. A scoring algorithm is used to identify a program as malicious code in response to a valid score and a malicious code score, as discussed herein.

In yet another embodiment, the method for detecting malicious code on a computer system includes executing detection routines, the detection routines having been configured to examine at least one selected from the group consisting of characteristics and behaviors of programs running on the computer system. For example, the detection routines can be configured to access process behavior data of a program running on the computer system. In addition, the characteristics and behaviors may include one or more of logging keystrokes, saving a display screen view, uploading files, downloading files, running programs, and controlling a display screen of the computer system.

Subsequent to execution of one or more of the detection routine, weights are assigned as a function of the examined characteristics and behaviors, the assigned weights indicative of a valid program or malicious code as a function of respective detection routines. Lastly, the method determines whether a program is malicious code as a function of the weights assigned by the detection routines.

In the embodiment of the previous paragraph, the detection routines include valid program detection routines and malicious code detection routines. The valid program detection routines are configured to determine whether the program exhibits at least one or more characteristics and behaviors associated with a valid program. The malicious code detection routines are configured to determine whether the program exhibits at least one or more characteristics and behaviors associated with malicious code.

In one embodiment, the method of detecting Trojans is carried out in the form of a computer program. The computer program is executed on a desired computer system for detecting any potential Trojans present on the computer system. Execution of the computer program continues until all active programs on the computer system have been tested and evaluated. Alternatively, other criteria may be established for a duration of testing with the Trojan detection program. For example, execution of the malicious code detection program can be configured to occur in response to one or more of a random initiation and a periodic initiation.

According to another embodiment, the Trojan detection program comprises a small program configured for being delivered quickly, as well as, for being executed quickly. The Trojan detection program can be delivered to the innocent victim's computer over a network, such as a Local Area Network (LAN), Wide Area Network (WAN), Internet, intranet, or any other global computer network 30. The Trojan detection program may also be delivered via suitable computer readable media, such as, media 26 shown in FIG. 1.

While not stopping an infection of the computer system with Trojans, the method of the present embodiments identifies a Trojan when executing on a computer system. The method of identifying a Trojan could be combined with other methods, for example, a method for detecting infection, resulting in a more robust computer system malicious code protection implementation.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. One or more computer-readable media storing program instructions executable by an information handling system to:
   while a first program is running on the information handling system in a manner that permits the first program to infect the information handling system, perform a plurality of detection routines to gather information relating to the first program, wherein the plurality of detection routines include a first set of malicious code detection routines and a second set of valid code detection routines;
   calculate a first composite score and a second composite score based on results of the plurality of detection routines, wherein said first composite score is indicative of the likelihood that the first program is malicious and is calculated using weights associated with those detection routines within the first set of malicious code detection routines whose results are indicative of the first program being malicious code, and wherein said second composite score is indicative of the likelihood that the first program is valid and is calculated using weights associated with those detection routines within the second set of valid code detection routines whose results are indicative of the first program being valid code, and wherein the second composite score is calculated independently from the first composite score; and
   use the first and/or second composite scores to categorize the first program with respect to the likelihood of the first program infecting the information handling system, including:
      categorizing the first program as malicious code when the first composite score is above a malicious code threshold value and the second composite score is below a valid code threshold value; and
      categorizing the first program as valid code when the second composite score is above the valid code threshold value.

2. The computer-readable media of claim 1 wherein the program instructions are executable by the information handling system to categorize a second program running on the information handling system as a valid program based on its calculated first composite score not exceeding a first threshold and its calculated second composite score exceeding a second threshold, wherein the second program is running on the information handling system in a manner that permits the second program to infect the information handling system.

3. The computer-readable media of claim 1, wherein the program instructions are executable by the information handling system to use the first and second composite scores to categorize the first program as a suspicious program.

4. The computer-readable media of claim 1, wherein the program instructions are executable by the information handling system to categorize the first program as a suspicious program based on the neither the first nor second composite scores exceeding a first threshold and a second threshold, respectively.

5. The computer-readable media of claim 1, wherein the program instructions are executable by the information handling system to categorize the first program as a suspicious program based on the first and second composite scores not being significantly different from one another.

6. The computer-readable media of claim 1, wherein the information handling system is a computer system.

7. The computer-readable media of claim 1, wherein the first and second composite scores are calculated using one or more detection routines that examine a binary image of the first program.

8. The computer-readable media of claim 7, wherein the binary image is in a memory of the information handling system.

9. The computer-readable media of claim 7, wherein the binary image is accessible to the information handling system.

10. The computer-readable media of claim 1, wherein the first and second composite scores are calculated using one or more accesses to an operating system of the information handling system to determine information relating to the first program, wherein the accesses are made via one or more APIs.

11. The computer-readable media of claim 1, wherein the first and second composite scores are calculated using one or more accesses to a memory of the information handling system to determine information relating to the first program.

12. The computer-readable media of claim 1, wherein the first and second composite scores are calculated using one or more accesses to a network connection of the information handling system to determine information relating to the first program.

13. The computer-readable media of claim 1, wherein the first and second composite scores are calculated by interfacing with an operating system kernel of the information handling system to determine information relating to the first program.

14. The computer-readable media of claim 1, wherein the first and second composite scores are calculated by interfacing with a device driver of the information handling system to determine information relating to the first program.

15. The computer-readable media of claim 1, wherein the plurality of detection routines include one or more detection routines executable to determine whether the first program is a Trojan horse.

16. The computer-readable media of claim 1, wherein the plurality of detection routines include one or more detection routines executable to determine whether the first program is a keystroke logger.

17. The computer-readable media of claim 1, wherein the plurality of detection routines include one or more detection routines executable to determine whether the first program is saving a screen view of the information handling system.

18. The computer-readable media of claim 1, wherein the plurality of detection routines include one or more detection routines executable to determine whether the first program is uploading/downloading files from/to the information handling system.

19. The computer-readable media of claim 1, wherein the plurality of detection routines include one or more detection routines executable to determine whether the first program is controlling a display screen of the information handling system.

20. The computer-readable media of claim 1, wherein the plurality of detection routines include one or more detection routines executable to determine libraries used by the first program.

21. The computer-readable media of claim 1, wherein the first program is a thread.

22. The computer-readable media of claim 1, wherein the first program is a plugin.

23. The computer-readable media of claim 1, wherein the first program is a device driver.

24. The computer-readable media of claim 1, wherein the first program is running in a kernel memory of an operating system of the information handling system.

25. One or more computer-readable media storing program instructions executable by an information handling system to:
while a first program is running on an operating system of the information handling system in a manner that permits the first program to infect the information handling system, perform a plurality of detection routines including:
a first set of two or more detection routines that examine one or more files corresponding to the first program; and
a second set of two or more detection routines that search for information about the first program from resources of the information handling system other than the one or more files, wherein the second set of detection routines includes one or more routines that access the operating system via one or more application programming interfaces (APIs) to determine information relating to the first program; and
use results of the plurality of detection routines, including results of the first set of detection routines and results of the second set of detection routines, to compute a first score and a second score, and to categorize the first program as to the likelihood of the first program infecting the information handling system based on either or both of the first and second scores, wherein the first score is indicative of the likelihood that the first program is malicious, and wherein the second score is indicative of the likelihood that the first program is valid;
wherein performing the plurality of detection routines does not prevent infection of the information handling system by the first program.

26. The computer-readable media of claim 25, wherein the first set of detection routines include two or more routines that examine a binary image of the first program for one or more signatures.

27. The computer-readable media of claim 26, wherein the binary image is in a memory of the information handling system or is accessible to the information handling system.

28. The computer-readable media of claim 25, wherein the first set of detection routines include one or more routines that determine a signature associated with at least one of the one or more files and compare the determined signature to a plurality of known signatures.

29. The computer-readable media of claim 25, wherein the second set of detection routines includes routines that determine whether the first program has characteristics and/or behaviors typically associated with a malicious program, and includes routines that determine whether the first program has characteristics and/or behaviors typically associated with a valid program.

30. The computer-readable media of claim 25, wherein the program instructions are executable to categorize the first program as a malicious program or a valid program.

31. The computer-readable media of claim 30, wherein the program instructions are executable to compute the first and second scores based on weighted results of various ones of the plurality of detection routines.

32. The computer-readable media of claim 25, wherein the program instructions are executable to categorize the first program as a malicious program, a valid program, or a suspicious program.

33. The computer-readable media of claim 25, wherein the second set of detection routines includes one or more detection routines that access a memory of the information handling system to determine information relating to the first program.

34. The computer-readable media of claim 25, wherein the second set of detection routines includes one or more detection routines that access a network connection of the information handling system to determine information relating to the first program.

35. The computer-readable media of claim 25, wherein the second set of detection routines includes one or more detection routines that interface with an operating system kernel of the information handling system to determine information relating to the first program.

36. The computer-readable media of claim 25, wherein the second set of detection routines includes one or more detection routines that interface with a device driver of the information handling system to determine information relating to the first program.

37. The computer-readable media of claim 25, wherein the plurality of detection routines include one or more detection routines to determine whether the first program is a Trojan horse.

38. The computer-readable media of claim 25, wherein the plurality of detection routines include one or more detection routines to determine whether the first program is a keystroke logger.

39. The computer-readable media of claim 25, wherein the plurality of detection routines include one or more detection routines to determine whether the first program is saving a screen view of the information handling system.

40. The computer-readable media of claim 25, wherein the plurality of detection routines include one or more detection routines to determine whether the first program is uploading/downloading files from/to the information handling system.

41. The computer-readable media of claim 25, wherein the plurality of detection routines include one or more detection routines to determine whether the first program is controlling a display of the information handling system.

42. A method, comprising:
  while a first program is running on an information handling system in a manner that permits the first program to infect the information handling system, independently calculating a first composite score and a second composite score, wherein said first composite score is indicative of the likelihood that the first program is malicious, and wherein said second composite score is indicative of the likelihood that the first program is valid; and
  categorizing the first program with respect to the likelihood of the first program infecting the information handling system, wherein said categorizing includes:
    categorizing the first program as malicious code when the first composite score is above a malicious code threshold value and the second composite score is below a valid code threshold value; and
    categorizing the first program as valid code when the second composite score is above the valid code threshold value;
  wherein the first composite score is calculated by using weighted results from a first set of detection routines for detecting characteristics and/or behaviors typically associated with malicious code, and wherein the second composite score is calculated using weighted results from a second set of detection routines for detecting characteristics and/or behaviors typically associated with valid code.

43. The method of claim 42, wherein said categorizing includes:
  categorizing the first program as a suspicious program based on 1) the first nor second composite scores not exceeding the malicious code threshold value and the valid code threshold value, respectively, and/or 2) the first and second composite scores not being significantly different from one another.

44. A method, comprising:
  while a first program is running on an operating system of an information handling system in a manner that permits the first program to infect the information handling system, performing a plurality of detection routines including:
    a first set of two or more detection routines that examine an image of one or more files corresponding to the first program;
    a second set of two or more detection routines that search for information about the first program from resources of the information handling system other than the one or more files, wherein the second set of detection routines includes one or more routines that access the operating system to determine information relating to the first program; and
  categorizing, using either or both of first and second scores computed from results of the first and second sets of detection routines, the first program as to the likelihood of the first program infecting the information handling system;
  wherein the first score is indicative of the likelihood that the first program is malicious, and wherein the second score is indicative of the likelihood that the first program is valid, and wherein performing the plurality of detection routines does not prevent infection of the information handling system by the first program.

45. The method of claim 44, wherein said resources include a network connection of the information handling system.

46. The method of claim 44, wherein said resources include a device driver of said information handling system.

47. The method of claim 44, wherein the accesses to the operating system are via documented application programming interfaces (APIs) of the operating system.

48. An information handling system, comprising:
  a central processing unit (CPU);
  a memory storing program instructions executable by the CPU to:
    while a first program is running on the information handling system in a manner that permits the first program to infect the information handling system, perform a plurality of detection routines and use the results to independently calculate a first composite score and a second composite score, wherein the first composite score is indicative of the likelihood that the first program is malicious, and wherein the second composite score is indicative of the likelihood that the first program is valid; and
    use the first and/or second composite scores to categorize the first program with respect to the likelihood of the first program compromising the security of the information handling system, including:
      categorizing the first program as malicious when the first composite score is above a first threshold value and the second composite score is below a second threshold value; and
      categorizing the first program as valid when the second composite score is above the second threshold value;
    wherein the first composite score is calculated using weighted results of a first set of detection routines for detecting characteristics and/or behaviors typically associated with malicious code, and wherein the second composite score is calculated using weighted results of a second set of detection routines for detecting characteristics and/or behaviors typically associated with valid code.

49. An information handling system, comprising:
  a central processing unit (CPU);
  a memory storing program instructions executable by the CPU to:
    while a first program is running on an operating system of the information handling system in a manner that permits the first program to infect the information handling system, perform a plurality of detection routines including:
      a first set of two or more detection routines that examine an image of one or more files corresponding to the first program for one or more signatures;
      a second set of two or more detection routines that search for information about the first program from resources of the information handling system other than the one or more files, wherein the second set of detection routines includes one or more routines that access the operating system running on the information handling system in order to determine information relating to the first program; and
    use results of the plurality of detection routines, including results of the first set of detection routines and results of the second set of detection routines, to compute a first score and a second score, and to categorize, based on either or both of the first and second scores, the first program as to the likelihood of the first program compromising the security of the information handling system, wherein the first score is indicative of the likelihood that the first program is malicious, and wherein the second score is indicative of the likelihood that the first program is valid;

wherein performing the plurality of detection routines does not prevent infection of the information handling system by the first program.

50. The information handling system of claim 49, wherein the one or more files corresponding to the first program are in the memory of the information handling system.

51. The information handling system of claim 50, wherein the one or more routines in the second set of detection routines that access the operating system running on the information handling system do so via one or more APIs, and wherein the second set of detection routines includes routines that determine whether the first program has characteristics and/or behaviors typically associated with a malicious program, and includes routines that determine whether the first program has characteristics and/or behaviors typically associated with a valid program;

wherein the program instructions are executable by the CPU to categorize the first program as a malicious program or a valid program.

52. The computer-readable media of claim 2, wherein the first and second programs are running on the information handling system concurrently.

53. The method of claim 42, wherein, for a second program running on the information handling system in a manner that permits the second program to infect the information handling system, the method further comprising:

independently calculating a first composite score and a second composite score for the second program, wherein said first composite score for the second program is indicative of the likelihood that the second program is malicious, and wherein said second composite score is indicative of the likelihood that the second program is valid;

categorizing the second program with respect to the likelihood of the second program infecting the information handling system, wherein said categorizing the second program includes categorizing the second program as valid code when the first composite score for the second program is below the malicious code threshold value and the second composite score for the second program is above the valid code threshold value.

54. The method of claim 53, wherein the first and second programs are running concurrently on the information handling system.

\* \* \* \* \*